United States Patent
Kawataki et al.

(10) Patent No.: US 12,240,764 B2
(45) Date of Patent: Mar. 4, 2025

(54) METHOD FOR PRODUCING PEROVSKITE COMPOUND, AND PEROVSKITE COMPOUND

(71) Applicant: SAKAI CHEMICAL INDUSTRY CO., LTD., Sakai (JP)

(72) Inventors: Takahiro Kawataki, Osaka (JP); Hideto Mizutani, Osaka (JP); Seiichi Yano, Osaka (JP)

(73) Assignee: Sakai Chemical Industry Co., Ltd., Osaka (JP)

( * ) Notice: Subject to any disclaimer, the term of this patent is extended or adjusted under 35 U.S.C. 154(b) by 5 days.

(21) Appl. No.: 17/912,738

(22) PCT Filed: Feb. 10, 2021

(86) PCT No.: PCT/JP2021/005023
§ 371 (c)(1),
(2) Date: Sep. 19, 2022

(87) PCT Pub. No.: WO2021/199702
PCT Pub. Date: Oct. 7, 2021

(65) Prior Publication Data
US 2023/0212023 A1 Jul. 6, 2023

(30) Foreign Application Priority Data

Mar. 30, 2020 (JP) .................... 2020-060818

(51) Int. Cl.
*C01G 23/00* (2006.01)
*H01G 4/12* (2006.01)

(52) U.S. Cl.
CPC ......... *C01G 23/006* (2013.01); *H01G 4/1227* (2013.01); *C01P 2002/34* (2013.01);
(Continued)

(58) Field of Classification Search
CPC ............... C01G 23/006; C01P 2002/34; C01P 2002/52; C01P 2002/54; C01P 2002/60;
(Continued)

(56) References Cited

U.S. PATENT DOCUMENTS 5,427,988 A * 6/1995 Sengupta .............. C04B 35/465
501/121
2007/0253145 A1* 11/2007 Kurozumi .......... H10N 30/8536
423/598
(Continued)

FOREIGN PATENT DOCUMENTS

CN 102583513 A * 7/2012
IN 201911012842 A * 10/2020
(Continued)

OTHER PUBLICATIONS

Translation of CN-102583513-A (Year: 2012).*
(Continued)

*Primary Examiner* — Hoa (Holly) Le
(74) *Attorney, Agent, or Firm* — HSML P.C.

(57) ABSTRACT

Provided is a method of producing fine particulate barium calcium titanate in which calcium forms a homogeneous solid solution. The present invention relates to a method of producing a perovskite compound represented by the following formula (1):

$$Ba_{(1-x)}A_xTiO_3 \qquad (1)$$

wherein A represents Ca or Sr, and x is a number satisfying $0.00<x\leq0.30$, the method including: a first step of acid washing barium titanate to provide barium titanate having a ratio of barium element to titanium element of lower than 1.00; a second step of mixing the barium titanate obtained in the first step and a calcium salt or a strontium salt and drying the mixture to provide a
(Continued)

dry mixture; and a third step of heating the dry mixture obtained in the second step.

3 Claims, 6 Drawing Sheets

(52) U.S. Cl.
CPC ...... *C01P 2002/52* (2013.01); *C01P 2002/72* (2013.01); *C01P 2002/85* (2013.01); *C01P 2004/03* (2013.01); *C01P 2004/04* (2013.01); *C01P 2006/12* (2013.01); *C01P 2006/40* (2013.01)

(58) Field of Classification Search
CPC .............. C01P 2002/72; C01P 2002/85; C01P 2006/12
See application file for complete search history.

(56) References Cited

U.S. PATENT DOCUMENTS

| 2008/0260624 A1 | 10/2008 | Ikeda et al. |
| 2016/0289082 A1 | 10/2016 | Yamanaka et al. |

FOREIGN PATENT DOCUMENTS

| JP | H04-016513 A | 1/1992 |
| JP | H05-330824 A | 12/1993 |
| JP | H06-064924 A | 3/1994 |
| JP | H11-335177 A | 12/1999 |
| JP | 2004-067504 A | 3/2004 |
| JP | 2005-089293 A | 4/2005 |
| JP | 2006-089368 | 4/2006 |
| JP | 2007-290944 A | 11/2007 |
| JP | 2008-150244 | 7/2008 |
| JP | 4438495 B2 | 3/2010 |
| JP | 2011-073929 A | 4/2011 |
| JP | 4743481 B2 | 8/2011 |
| JP | 2011-184247 A | 9/2011 |
| JP | 5089870 B2 | 12/2012 |
| JP | 2019-119630 A | 7/2019 |
| KR | 10-2005-0058670 A | 6/2005 |
| KR | 10-2006-0030230 A | 4/2006 |
| TW | 201718434 | 6/2017 |
| TW | 201925095 | 7/2019 |
| WO | 2006/090488 A1 | 8/2006 |
| WO | 2011/024582 | 3/2011 |
| WO | 2015/075982 | 5/2015 |

OTHER PUBLICATIONS

Translation of IN 201911012842 A (Year: 2020).*
Wamg et al., Synthesis and characterization of Ba1-xSrxTiO3 nanopowders by citric acid gel method, Ceramics International 33 (2007) 1105-1109 (Year: 2007).*
Tihtih et al., Synthesis of Ba1-xSrxTiO3 (x=0-0.3) Ceramic Powders via Sol-Gel Method: Structural, Microstructure, Thermal Conductivity, and Compressive Strength Properties, Cryst. Res. Technol. 2022, 57, 2100106 (Year: 2022).*
Calcium Nitrate Tetrahydrate, FujiFilm Wako Pure Chemical Corporation, Safety Data Sheet according to JIS Z 7253:2019, Version 2.03, Oct. 28, 2020, 12 pages w/translation.
Hayashi et al., Preparation of (BaxSr1-x)TiO3 Particles by Vapor-Phase Hydrolysis of Precursors Formed from Alkoxide-Hydroxide, Jpn. J. Phys. vol. 37, Part 1, No. 9B (Sep. 1998) pp. 5232-5236.
Kim, et al., "A Synthesis of (Ba1-xSrx) TiO3 Powders by Sol-Gel Route", Korean Journal of Materials Research, vol. 2, No. 2, 1992, pp. 151-156 w/Abstract & concise Explanation of the disclosure.

* cited by examiner

Example 8

Example 9

Example 10

FIG.10

METHOD FOR PRODUCING PEROVSKITE COMPOUND, AND PEROVSKITE COMPOUND

TECHNICAL FIELD

The present invention relates to methods of producing a perovskite compound and perovskite compounds.

BACKGROUND ART

Perovskite compounds have a perovskite crystal structure common to ternary transition metal oxides such as barium titanate, and known perovskite compounds include various compounds.

Barium calcium titanate, a type of perovskite compound, is a compound produced by replacing one or more barium sites of barium titanate by calcium. Barium calcium titanate having been subjected to such replacement has attracted attention as an electronic material having improved temperature dependence of the dielectric properties and reliability as compared to barium titanate, and is used in multilayer ceramic capacitor applications.

As for barium calcium titanate, Patent Literature 1 proposes barium calcium titanate containing 3 mol % or less of an orthorhombic perovskite compound and having a specific surface area of 1 m²/g or more and 100 m²/g or less, and a method of producing such barium calcium titanate.

CITATION LIST

Patent Literature

Patent Literature 1: JP 5089870 B

SUMMARY OF INVENTION

Technical Problem

In response to the recent decrease in thickness of multilayer ceramic capacitors, refinement of barium calcium titanate is required for use as an electronic material of capacitors. Production of barium calcium titanate in which calcium forms a homogeneous solid solution requires high-temperature heating. However, the heating promotes particle growth, making it difficult to obtain fine particulate barium calcium titanate in which calcium forms a homogeneous solid solution.

The present invention was made in view of the current situation described above, and aims to provide a method of producing fine particulate barium calcium titanate in which calcium forms a homogeneous solid solution.

Solution to Problem

The present inventors have examined a method of producing a fine particulate perovskite compound in which an alkaline earth metal element such as calcium or strontium forms a homogeneous solid solution with barium titanate and have found the following method. Specifically, barium titanate is acid washed to provide barium titanate having a ratio of barium element to titanium element equal to or less than a certain value, the resulting barium titanate is mixed with a calcium salt or a strontium salt, and the mixture is heated. Thereby, a fine particulate perovskite compound in which calcium or strontium forms a homogeneous solid solution can be produced.

Furthermore, the present inventors have also found a technique to confirm that an alkaline earth metal element forms a solid solution with barium titanate.

That is, the present invention relates to a method of producing a perovskite compound represented by the following formula (1):

$$Ba_{(1-x)}A_xTiO_3 \qquad (1)$$

wherein A represents Ca or Sr, and x is a number satisfying $0.00 < x \leq 0.30$, the method including:
a first step of acid washing barium titanate to provide barium titanate having a ratio of barium element to titanium element of lower than 1.00;
a second step of mixing the barium titanate obtained in the first step and a calcium salt or a strontium salt and drying the mixture to provide a dry mixture; and
a third step of heating the dry mixture obtained in the second step.

Preferably, the barium titanate obtained in the first step has a BET specific surface area of 20 to 130 m²/g.

Preferably, the method of producing a perovskite compound further includes
a fourth step of breaking up agglomerated particles of the perovskite compound obtained in the third step by heating the perovskite compound in a solvent at a temperature of 30° C. to 500° C.

The present invention also relates to a perovskite compound represented by the following formula (1):

$$Ba_{(1-x)}A_xTiO_3 \qquad (1)$$

wherein A represents Ca or Sr, and x is a number satisfying $0.00 < x \leq 0.30$,
the perovskite compound satisfying the relationship (2):

$$E + 0.0031 \times D \leq 38.94 \qquad (2)$$

wherein E represents a 2θ value of (111) plane in crystal phase analysis by powder X-ray diffraction, and D represents a BET specific surface area (m²/g).

Preferably, the perovskite compound has a BET specific surface area of 8 to 70 m²/g.

Advantageous Effects of Invention

The method of producing a perovskite compound of the present invention can produce a fine particulate perovskite compound in which an alkaline earth metal element such as calcium or strontium forms a homogeneous solid solvent without complicated processes. The method is suitable as a method of producing barium calcium titanate for use in electronic material applications such as multilayer ceramic capacitors.

DESCRIPTION OF EMBODIMENTS

Preferred embodiments of the present invention will be described in detail below. The present invention should not be limited to the description below, and appropriate modifications can be made without changing the gist of the present invention.

1. Method of Producing Perovskite Compound

The method of producing a perovskite compound of the present invention (hereinafter, also referred to as a production method of the present invention) includes: a first step of washing barium titanate to provide barium titanate having a ratio of barium element to titanium element of lower than 1.00; a second step of mixing the barium titanate obtained in the first step and a calcium salt or a strontium salt and drying the mixture to provide a dry mixture; and a third step of heating the dry mixture obtained in the second step.

Barium titanate is acid washed to leach barium element from the barium titanate in the first step, the resulting barium titanate poor in barium element is mixed with a calcium salt or a strontium salt, the mixture is dried to give a dry mixture, and the dry mixture is heated. Thereby, a fine particulate perovskite compound in which calcium or strontium forms a solid solution can be produced. The production method of the present invention can produce a perovskite compound containing a larger amount of calcium or strontium forming a solid solution than conventional production methods of barium calcium titanate.

In the first step, the ratio of barium element to titanium element should be reduced to lower than 1.00 by washing the barium titanate. Thereby, a perovskite compound in which calcium or strontium forms a solid solution can be produced. In the subsequent steps, the ratio of barium element to titanium element is desirably adjusted according to the amount of calcium or strontium forming a solid solution so that the ratio of the sum of barium element and calcium element to titanium element or the ratio of the sum of barium element and strontium element to titanium element is not higher than 1.00.

The ratio of barium element to titanium element can be determined by X-ray fluorescence analysis (XRF).

The acid washing of barium titanate in the first step enables efficient leaching of barium element from barium titanate. The acid washing should achieve a ratio of barium element to titanium element of lower than 1.00. Preferably, an acid is added while a slurry of the barium titanate is stirred.

The acid used for the acid treatment may be an inorganic acid such as hydrochloric acid, sulfuric acid, nitric acid, or phosphoric acid, or an organic acid such as acetic acid, oxalic acid, or citric acid.

The ratio of barium element to titanium element may be reduced to lower than 1.00 by water washing, which is not practical because the water washing requires a huge amount of water. Leaching barium element with an acid is quantitative and suitable for industrial production.

When the slurry of the barium titanate is acid washed in the first step, a solvent to be used to prepare the slurry of the barium titanate may be any of organic solvents and inorganic solvents. Examples thereof include water and water-miscible organic solvents such as methanol and ethanol. Each of these may be used alone, or two or more of these may be used. Of these, water or a mixture of a water-miscible organic solvent and water is preferred.

The slurry to be used may have any concentration and preferably has a solid concentration of 10 to 500 g/L. With too low a solid concentration, the productivity may be low, while with too high a solid concentration, the acid washing may be uneven.

The acid treatment in the first step may be performed in any way as long as the ratio of barium element to titanium element of the barium titanate can be reduced to lower than 1.00. Preferably, an acid is added to the barium titanate so that the slurry has a pH of 5 to 11. The pH of the slurry is preferably adjusted within the pH range indicated above depending on the specific surface area of the barium titanate used as a raw material in the first step and the amount of barium element to be replaced by calcium element or strontium element. For example, when hydrothermally synthesized barium titanate having a BET specific surface area of 60 to 70 $m^2/g$ is acid treated at a pH of 6, the ratio of barium element to titanium element is about 0.87 to 0.88, while when it is treated at a pH of 9, the ratio is about 0.92 to 0.93.

The barium titanate having been acid treated in the first step is preferably washed with water before the barium titanate is subjected to the second step. This allows the acid and leached barium element to be removed from the barium titanate, producing a perovskite in which a large amount of calcium or strontium forms a solid solution and which contains few impurities.

The washing in the first step is preferably performed until the electrical conductivity of the washing water is reduced to not higher than 100 μS/cm, more preferably to not higher than 50 μS/cm, for sufficient leaching of barium element and production efficiency.

The barium titanate used as a raw material in the first step is preferably, but not limited to, one having a BET specific surface area of 20 to 130 $m^2/g$. Use of barium titanate with a small particle size having a BET specific surface area within the range indicated above can lead to more efficient leaching of barium element in the first step, and a perovskite compound produced by the production method of the present invention can have a smaller particle size. The BET specific surface area of the barium titanate used in the first step is more preferably 40 to 120 $m^2/g$, still more preferably 60 to 100 $m^2/g$. The larger the specific surface area of the barium titanate used as a raw material, the more barium element is leached out. Thus, the specific surface area of the barium titanate is preferably appropriately adjusted within the range indicated above depending on the amount of barium element to be replaced by calcium element or strontium element.

The BET specific surface area of the barium titanate obtained in the first step is preferably the same as described above.

The barium titanate used as a raw material in the first step may be produced by any method, and examples thereof include a hydrothermal method, a solid phase method, a sol-gel method, an organic acid salt method, and an alkoxide method. A hydrothermal method is preferred because it can produce barium titanate having a large BET specific surface area. Use of barium titanate having a larger specific surface area as a raw material enables more efficient leaching of barium element in the first step. Thereby, the amount of calcium element or strontium element replaced can be increased. The barium titanate obtained by the hydrothermal method is suitable as a raw material used in the first step because such barium titanate contains many hydroxyl groups on the particle surfaces, and barium near the surfaces is easily leached out.

The second step includes mixing the barium titanate obtained in the first step and a calcium salt or a strontium salt and drying the mixture to provide a dry mixture.

Non-limiting examples of a calcium salt and a strontium salt to be mixed with the barium titanate include oxides, hydroxides, chlorides, carbonates, sulfates, nitrates, phosphates, hydroiodic acid, and organic acid salts of calcium or strontium, such as, acetates, oxalates, and citrate. Each of these may be used alone, or two or more of these may be used.

When a calcium salt is used in the second step, the amount of the calcium salt to be used is preferably such that the amount of calcium element in the calcium salt is more than 0 mol % and not more than 30 mol % per 100 mol % of the titanium element in the barium titanate. Use of a calcium salt in such a ratio enables synthesis of a high purity barium calcium titanate in which calcium forms a solid solution with barium titanate and which contains no crystal phases other than the crystal phase of barium calcium titanate. The amount of the calcium salt to be used is more preferably such that the amount of calcium element in the calcium salt is 0.5 to 25 mol %, still more preferably 1 to 20 mol %, per 100 mol % of the titanium element in the barium titanate.

When a strontium salt is used in the second step, the strontium salt is preferably used such that the percentage of the amount of strontium element in the strontium salt is the same as that described above per 100 mol % of the titanium element in the barium titanate.

In the second step, the barium titanate and a calcium salt or a strontium salt may be mixed in any way as long as they are sufficiently mixed. An example of the method is adding an aqueous solution of calcium or strontium to a barium titanate slurry and stirring the slurry with a stirrer or the like.

In the second step, the mixture of the barium titanate and a calcium salt or a strontium salt is dried before the mixture is subjected to the third step of heating. This prevents compositional segregation to provide a precursor with uniform distribution of calcium element or strontium element.

The mixture is preferably dried by, but not limited to, using any of box dryers, fluid bed dryers, airflow dryers, and spray dryers.

The drying the mixture in the second step is preferably performed at 80° C. to 300° C., more preferably at 90° C. to 110° C.

When the mixture is dried using a box dryer, the duration of the drying is preferably 0.5 to 24 hours, more preferably 2 to 6 hours.

The third step is heating the dry mixture obtained in the second step.

In the third step, the dry mixture of the barium titanate and a calcium salt or a strontium salt is preferably heated at 500° C. to 1200° C., more preferably at 550° C. to 1000° C., still more preferably at 600° C. to 900° C.

The duration of the heating is preferably 0.5 to 12 hours, more preferably 1 to 10 hours, still more preferably 2 to 8 hours.

The heating may be performed, but not limited to, in air or in an inert gas atmosphere such as a nitrogen or argon atmosphere.

The method of producing a perovskite compound of the present invention may further include breaking up agglomerated particles of the perovskite compound obtained in the third step. This enables production of a perovskite compound in which the particles are less bonded to each other.

The agglomerated particles of the perovskite compound obtained in the third step may be broken up in any way and are preferably broken up by heating the perovskite compound obtained in the third step in a solvent at 30° C. to 500° C. The method can sufficiently break up the agglomerated particles of the perovskite compound to provide a perovskite compound in which the particles are less bonded to each other and the proportion of near-spherical particles is high. In a preferred embodiment of the present invention, the method of the present invention includes a fourth step of breaking up the agglomerated particles of the perovskite compound obtained in the third step by heating the perovskite compound in a solvent at a temperature of 30° C. to 500° C.

In the fourth step, a solvent to be used to heat the perovskite compound may be any of organic solvents and inorganic solvents. Examples thereof include water and water-miscible organic solvents such as methanol and ethanol. Each of these may be used alone, or two or more of these may be used. Of these, water or a mixture of a water-miscible organic solvent and water is preferred.

In the fourth step, the perovskite compound may be heated at a temperature of 30° C. to 500° C. To more sufficiently break up the agglomerated particles of the perovskite compound, the temperature is preferably 60° C. to 300° C., more preferably 100° C. to 200° C.

In the fourth step, the perovskite compound is preferably heated for 1 to 120 hours, more preferably 2 to 72 hours, still more preferably 4 to 30 hours, to sufficiently break up the agglomerated particles of the perovskite compound, but the duration is not limited thereto.

The heating may be performed, but not limited to, in air or in an inert gas atmosphere such as a nitrogen or argon atmosphere.

In the fourth step, to the solvent may be added an acid, a base, or a component serving as an acid or a base in the solvent. Addition of any of these components allows the agglomerated particles to be more efficiently broken up.

Examples of the acid include the acids used for the acid treatment in the first step listed above.

Examples of the base include inorganic bases such as hydroxides of alkali metals or alkaline earth metals (e.g., lithium hydroxide, sodium hydroxide, potassium hydroxide, and barium hydroxide) and organic bases such as organic amines. Of these, barium hydroxide is preferably used because it is highly effective in breaking up the agglomerated particles of the perovskite compound.

Each of the acids, the bases, the component serving as an acid or a base may be used alone, or two or more of these may be used.

The method of producing a perovskite compound of the present invention may include a different step other than the steps described above. Examples of the different step include dispersing the perovskite compound obtained in the third step or fourth step, washing the perovskite compound obtained in the third step or fourth step, and drying the washed perovskite compound.

The dispersing the perovskite compound may be performed by any technique. An example of the technique is using a disperser with media such as a bead mill or a media-less disperser such as an emulsifying machine or an ultrasonic disperser.

The washing the perovskite compound may be performed by any technique, and is preferably performed by water washing.

The drying the washed perovskite compound may be performed by any technique. An example of the technique is using any of box dryers, fluidized bed dryers, airflow dryers, and spray dryers. Specifically, when a box dryer is used, the drying is performed at 80° C. to 300° C. for 0.5 to 24 hours.

2. Perovskite Compound

Conventional methods of producing barium calcium titanate can introduce only a small amount of calcium in a solid solution in the product. Thus, when a large amount of calcium is used, calcium salts other than barium calcium titanate are introduced in the product. On the other hand, the method of producing a perovskite compound of the present invention allows barium titanate to contain a large amount of calcium or strontium forming a solid solution. Thus, desired perovskite compounds can be produced from those in which a small amount of calcium or strontium forms a solid solution to those in which a large amount thereof forms a solid solution by controlling the amount of calcium or strontium forming a solid solution. The present invention also encompasses a perovskite compound that can be produced by such a production method of the present invention, namely, a perovskite compound represented by the following formula (1):

$$Ba_{(1-x)}A_xTiO_3 \quad (1)$$

wherein A represents Ca or Sr, and x is a number satisfying 0.00<x≤0.30,
the perovskite compound satisfying the relationship (2):

$$E+0.0031\times D \leq 38.94 \quad (2)$$

wherein E represents a 2θ value of (111) plane in crystal phase analysis by powder X-ray diffraction, and D represents a BET specific surface area (m²/g).

The perovskite compound of the present invention is a solid solution of calcium or strontium in barium titanate produced by replacing a barium site of the barium titanate by calcium or strontium. It is known that a compound produced by replacing a barium site of barium titanate by calcium or strontium has a smaller crystal lattice than that before replacement due to the relationship between the ionic radiuses of barium and calcium or strontium, and thus, the compound has a XRD profile with peaks shifted to the higher angle side. Unsubstituted barium titanate also tends to have a XRD profile with peaks shifted to the higher angle side as the particle size increases. The reason for this is not clearly known, but it is presumably because grains grow to promote elimination of water or hydroxyl groups incorporated in the lattice, leading to shrinkage of the lattice.

The present inventors measured the 2θ value E of (111) plane of unsubstituted barium titanate with different particle sizes (specific surface areas), and the values obtained are plotted on a graph with E as the vertical axis and a BET specific surface area D (m²/g) as the horizontal axis. The present inventors found that the values E and D satisfy the relationship E=−0.0031×D+38.91. This indicates that when the measured values E and D of the perovskite compound of the present invention satisfy that E is larger than −0.0031× D+38.91, the peak shift of E involves the shift due to the replacement of a barium site by calcium or strontium. Such an analysis that takes into account both the peak shift due to the particle size of the barium titanate and the peak shift due to the replacement of a barium site by calcium or strontium has not been performed so far and is a technique found by the present inventors.

Thus, whether a barium site in the barium titanate has been replaced by calcium or strontium can be determined by examining whether the 2θ value of the perovskite compound of the present invention is higher than the 2θ value of the unsubstituted product at the same specific surface area value, in other words, whether E is larger than −0.0031×D+38.91. The method of producing a perovskite compound of the present invention can produce a perovskite compound satisfying not only that E is larger than −0.0031×D+38.91 but also that E is 38.94 or greater and containing a large amount of replaced calcium or strontium. Such a perovskite compound containing a large amount of calcium or strontium replaced is the perovskite compound of the present invention that satisfies the relationship (2).

The barium calcium titanate obtained by the production method described in Patent Literature 1 has a XRD profile in which the peak shift is not sufficient in the region of the specific surface area of 20 m²/g or more. As a result, the formation of the solid solution of calcium is insufficient and may not impart sufficient performance in multilayer ceramic capacitor applications or other applications. Conventional methods fail to produce a perovskite compound satisfying the relationship (2) and E of larger than 38.94.

On the other hand, the production method of the present invention synthesizes barium calcium titanate satisfying that E is 38.94 or greater in the region where the amount of calcium element to the amount of titanium element is not larger than 0.01 mol and that sufficient replacement by Ca element occurred. This suggests that the Replacement is more sufficient than that in the prior art even in the region where the amount of Ca element is very small. This may possibly provide multilayer ceramic capacitors having significantly improved reliability.

The perovskite compound represented by the formula (1) where x satisfies 0.00<x≤0.30 includes those in which a small amount of calcium or strontium forms a solid solution and x satisfies 0.00<x≤0.15 and those in which a large amount of calcium or strontium forms a solid solution and x satisfies 0.15<x≤0.30. Preferably, x satisfies 0.005≤x≤0.25. More preferably, x satisfies 0.01≤x≤0.20.

The perovskite compound in which a small amount of calcium or strontium forms a solid solution and x satisfies 0.00<x≤0.15 is considered to be suitable for multilayer ceramic capacitors, in particular, consumer-use capacitors (e.g., smartphones, tablets), which require a balance between compactness with high capacitance and good reliability for improving temperature characteristics and reliability while maintaining high ferroelectricity. The perovskite compound in which a large amount of calcium or strontium forms a solid solution and x satisfies 0.15<x≤0.30 is considered to further improve temperature characteristics due to the large amount of solid solution and is thus considered to be suitable for automotive capacitors, which require higher heat resistance at higher temperatures.

The perovskite compound of the present invention contains no calcium salts other than barium calcium titanate, and thus has no crystal phases other than the crystal phase of the compound represented by formula (1) in the crystal phase identification by XRD. Here, the phrase "has no crystal phases other than the crystal phase of the compound represented by formula (1)" means "has substantially no crystal phases", and means that no crystal phases other than the crystal phase of the compound represented by the formula (1) are observed in the crystal phase identification by XRD. Based on this, a perovskite compound in which a small amount of a different phase other than the compound represented by the formula (1) is contained, but not observed in crystal phase identification by XRD, corresponds to the compound that "has no crystal phases other than the crystal phase of the compound represented by formula (1) in the crystal phase identification by XRD".

The crystal phase identification by XRD of the perovskite compound can be performed by the technique described in the EXAMPLES.

The perovskite compound of the present invention preferably has a BET specific surface area of 8 to 70 m$^2$/g. The perovskite compound in the form of particles having a small particle size having such a BET specific surface area is suitable for electronic material applications such as multilayer ceramic capacitors. To reduce re-agglomerated components in the dispersing to achieve easy dispersion, a perovskite compound having a small BET specific surface area is more suitable. The BET specific surface area of the perovskite compound is more preferably 15 to 65 m$^2$/g, still more preferably 20 to 60 m$^2$/g.

In a preferred embodiment of the present invention, the perovskite compound of the present invention has a maximum value of the ratio of the maximum length (absolute maximum length) to the equivalent circle diameter (Absolute maximum length/Equivalent circle diameter) calculated for 200 to 300 perovskite compound particles of 1.5 or lower and a coefficient of variation of the ratio of 0.07 or lower.

As described in the BACKGROUND ART, barium titanate having been subjected to replacement of one or more barium sites of the barium titanate by calcium or strontium has improved temperature dependence of the dielectric properties and reliability. Thus, the perovskite compound of the present invention is considered to be used as an electronic material in multilayer ceramic capacitor applications. In response to the recent decrease in thickness of multilayer ceramic capacitors, the electronic materials of the multilayer ceramic capacitors are also required to have uniform particle size and fewer necked particles (improved particle independence). The perovskite compound having the Absolute maximum length/Equivalent circle diameter and the coefficient of variation indicated above has higher particle independence and is thus suitable for electronic material applications.

The maximum value of Absolute maximum length/Equivalent circle diameter is more preferably 1.45 or lower, still more preferably 1.40 or lower.

The coefficient of variation is more preferably 0.06 or lower, still more preferably 0.05 or lower.

The maximum length and equivalent circle diameter of the particulate perovskite compound can be determined by the method described in the EXAMPLES below, and the coefficient of variation can be obtained by the method described in the EXAMPLES below.

The perovskite compound having a maximum value of the ratio of the maximum length (absolute maximum length) to the equivalent circle diameter (Absolute maximum length/Equivalent circle diameter) calculated for 200 to 300 perovskite compound particles of 1.5 or lower and a coefficient of variation of the ratio of 0.07 or lower may be produced by any method. Preferably, in the method of producing a perovskite compound of the present invention, the fourth step of breaking up the agglomerated particles of the perovskite compound obtained in the third step is performed by heating the perovskite compound in a solvent at a temperature of 30° C. to 500° C. The fourth step of breaking up the agglomerated particles can produce a perovskite compound in which the particles are less bonded to each other and the proportion of near-spherical particles is high.

Particularly preferably, the fourth step is performed on a perovskite compound represented by the formula (1) where x is 0.15 or less. If the fourth step is performed on barium titanate in which a large amount of calcium or strontium forms a solid solution and x is greater than 0.15, a different phase other than the crystal phase of the compound represented by the formula (1) may be formed. On the other hand, when the fourth step is performed on a perovskite compound where x is 0.15 or less, the formation of such a different phase is sufficiently prevented. Thus, in a preferred embodiment of the present invention, the perovskite compound of the present invention is represented by the formula (1) where x is 0.15 or less and has a maximum value of Absolute maximum length/Equivalent circle diameter of 1.5 or lower and a coefficient of variation of the ratio of 0.07 or lower.

The method of producing a perovskite compound of the present invention can produce fine particulate calcium barium titanate in which a large amount of calcium forms a solid solution. Barium calcium titanate, which is a type of the perovskite compound of the present invention, obtained by the production method of the present invention is suitable for electronic material applications such as multilayer ceramic capacitors.

EXAMPLES

Specific examples are given to illustrate the present invention in detail below, but the present invention is not limited to these examples.

Example 1

(Production of Barium Titanate Material)

A 5-L reaction vessel was charged with 326 mL of pure water and 545 g of barium hydroxide octahydrate (available from Sakai Chemical Industry Co., Ltd.). The contents were heated to 100° C. so that the barium hydroxide octahydrate was dissolved in water. Thus, an aqueous barium hydroxide solution was prepared.

To the aqueous barium hydroxide solution maintained at 100° C. was added a titanium hydroxide water slurry (available from Sakai Chemical Industry Co., Ltd., 110 g/L as titanium dioxide) maintained at 100° C. over one hour. The contents were reacted at 100° C. for two hours to give a barium titanate precursor water slurry having a concentration of 0.68 mol/L in terms of BaTiO$_3$. The Ba/Ti molar ratio was 2.2 at the completion of addition of the titanium hydroxide water slurry to the aqueous barium hydroxide solution.

The barium titanate precursor water slurry was placed in an autoclave vessel and hydrothermally treated at 110° C. for two hours. The contents in the autoclave were cooled to room temperature to give a barium titanate material slurry.
(First Step)

A 20% aqueous nitric acid solution was added dropwise to the barium titanate material slurry while the slurry was stirred with a stirrer so that the pH of the slurry was adjusted to 6.0. The pH was maintained for 30 minutes. The slurry was then filtered and washed with water until the electrical conductivity of the filtrate reached 100 pS/cm or lower.

Thus, a washed cake was obtained. Pure water was added to the washed cake, and stirred with a stirrer. Additional pure water was added thereto so that the solid concentration was adjusted to 100 g/L. Thus, a washed barium titanate raw slurry was obtained. A portion of the slurry was sampled and dried in a dryer at 130° C. and subjected to XRF analysis to determine the Ba/Ti ratio, which was found to be 0.870. Also, the specific surface area was determined by the BET method, which was found to be 68.2 $m^2/g$.

(Second Step)

To a 100-mL portion of the washed barium titanate raw slurry was added 0.98 g of calcium acetate monohydrate (available from Kanto Chemical Co., Ltd.). The contents were stirred with a stirrer and then dried in a box dryer at 130° C. for two hours. The dry product was crushed in a mortar or the like to give a barium calcium titanate precursor powder.

(Third Step)

A 10-g portion of the barium calcium titanate precursor powder was placed in an alumina crucible and heated at 800° C. for two hours in an atmosphere sintering furnace. Thus, an attached solid barium calcium titanate was obtained.

(Fourth Step)

A 7-g portion of the attached solid barium calcium titanate obtained as described above was placed in an autoclave vessel, and 10 g of pure water and 2 g of a 10% aqueous sodium hydroxide solution were added thereto. The contents were hydrothermally treated at 160° C. for 24 hours. The contents in the autoclave were cooled to room temperature. The slurry collected was filtered and washed with water until the electrical conductivity of the filtrate reached 100 μS/cm or lower and dried in a box dryer at 110° C. for six hours. The dry solid was crushed in a mortar to obtain a barium calcium titanate powder.

Example 2

A barium calcium titanate powder was obtained as in Example 1, except that the heating was performed in an atmosphere sintering furnace at 700° C. for two hours in the third step.

Example 3

A barium calcium titanate powder was obtained as in Example 1, except that the heating was performed in an atmosphere sintering furnace at 600° C. for two hours in the third step.

Example 4

An attached solid barium calcium titanate was obtained by performing the first to third steps as in Example 1, except that the barium titanate precursor water slurry was hydrothermally treated at 100° C. in the production of barium titanate material, and 1.51 g of calcium acetate monohydrate was added in the second step. The washed barium titanate raw material had a Ba/Ti ratio of 0.671 and a specific surface area of 119 $m^2/g$.

A 7-g portion of the attached solid barium calcium titanate obtained as described above was crushed in a mortar. Thus, a barium calcium titanate powder was obtained.

Example 5

A barium calcium titanate powder was obtained as in Example 4, except that 1.89 g of calcium acetate monohydrate was added in the second step.

Example 6

A barium calcium titanate powder was obtained as in Example 5, except that the heating was performed in an atmosphere sintering furnace at 700° C. for two hours in the third step.

Example 7

A barium calcium titanate powder was obtained as in Example 5, except that the heating was performed in an atmosphere sintering furnace at 600° C. for two hours in the third step.

Example 8

A barium calcium titanate powder was obtained as in Example 1, except that 0.15 g of calcium acetate monohydrate was added in the second step, the drying equipment was a spray dryer, and 1.29 g of barium hydroxide octahydrate (available from Sakai Chemical Industry Co., Ltd.) was added instead of sodium hydroxide in the fourth step.

Example 9

A barium calcium titanate powder was obtained as in Example 1, except that 0.38 g of calcium acetate monohydrate was added in the second step, the drying equipment was a spray dryer, the heating was performed in an atmosphere sintering furnace at 700° C. for two hours in the third step, and 0.99 g of barium hydroxide octahydrate (available from Sakai Chemical Industry Co., Ltd.) was added instead of sodium hydroxide in the fourth step.

Example 10

A barium calcium titanate powder was obtained as in Example 1, except that 0.23 g of calcium acetate monohydrate was added in the second step, the drying equipment was a spray dryer, the heating was performed in an atmosphere sintering furnace at 600° C. for two hours in the third step, and 1.19 g of barium hydroxide octahydrate (available from Sakai Chemical Industry Co., Ltd.) was added instead of sodium hydroxide in the fourth step.

Example 11

A barium calcium titanate powder was obtained as in Example 9, except that the heating was performed in an atmosphere sintering furnace at 900° C. for two hours in the third step.

Example 12

A barium calcium titanate powder was obtained as in Example 1, except that 0.08 g of calcium acetate monohydrate was added in the second step, the heating was performed in an atmosphere sintering furnace at 700° C. for two hours in the third step, and 1.39 g of barium hydroxide octahydrate (available from Sakai Chemical Industry Co., Ltd.) was added instead of sodium hydroxide in the fourth step.

Example 13

A barium calcium titanate powder was obtained as in Example 8, except that the pH of the slurry was set to 9.0 in the first step, the drying was performed in a box dryer at 130° C. for two hours in the second step, and 0.71 g of barium hydroxide octahydrate (available from Sakai Chemical Industry Co., Ltd.) was added in the fourth step.

Example 14

A barium calcium titanate powder was obtained as in Example 1, except that the barium titanate precursor water slurry was hydrothermally treated at 190° C. for one hour in the production of barium titanate material, the pH of the slurry was set at 5.0 in the first step, 0.38 g of calcium acetate monohydrate was added in the second step, the heating was performed in an atmospheric sintering furnace at 600° C. for two hours in the third step, and 0.28 g of barium hydroxide octahydrate (Sakai Chemical Industry Co., Ltd.) was added instead of sodium hydroxide in the fourth step.

Example 15

An attached solid barium strontium titanate was obtained by performing the first to third steps as in Example 1, except that 0.92 g of strontium acetate hemihydrate was added instead of calcium acetate monohydrate in the second step.

A 7-g portion of the attached solid barium strontium titanate obtained as described above was crushed in a mortar. Thus, a barium strontium titanate powder was obtained.

Example 16

An attached solid barium strontium titanate was obtained by performing the first to third steps as in Example 1, except that 0.46 g of strontium acetate hemihydrate was added instead of calcium acetate monohydrate in the second step.

A 7-g portion of the attached solid barium strontium titanate obtained as described above was crushed in a mortar. Thus, a barium strontium titanate powder was obtained.

Comparative Example 1

A barium calcium titanate powder was obtained as in Example 1, except that the addition of nitric acid and pH adjustment in the first step were omitted and 1.51 g of calcium acetate monohydrate was added in the second step. The washed barium titanate raw material had a Ba/Ti ratio of 1.000 and a specific surface area of 50 m²/g.

Comparative Example 2

An attached solid barium calcium titanate was obtained by performing the first to third steps as in Example 1, except that the addition of nitric acid and pH adjustment in the first step were omitted and 1.51 g of calcium acetate monohydrate was added in the second step. The washed barium titanate raw material had a Ba/Ti ratio of 1.000 and a specific surface area of 50 m²/g.

A 7-g portion of the attached solid barium calcium titanate obtained as described above was crushed in a mortar to obtain a barium calcium titanate powder.

Comparative Example 3

A barium calcium titanate powder was obtained as in Comparative Example 2, except that 0.38 g of calcium acetate monohydrate was added in the second step and the heating was performed in an atmosphere sintering furnace at 700° C. for two hours in the third step.

Comparative Example 4

A 5-L reaction vessel was charged with 531 mL of pure water and 242.7 g of barium hydroxide octahydrate (available from Sakai Chemical Industry Co., Ltd.). The contents were heated to 100° C. so that the barium hydroxide octahydrate was dissolved in water. Thus, an aqueous barium hydroxide solution was prepared. The solution had a pH of 13.5 or higher.

To the aqueous barium hydroxide solution maintained at 100° C. was added a titanium hydroxide water slurry (available from Sakai Chemical Industry Co., Ltd., 110 g/L as titanium dioxide) maintained at 100° C. over one hour. Thereafter, the temperature was maintained at 100° C. for two hours.

Next, to the reaction solution were added 1.11 g of calcium hydroxide (special grade, Wako Pure Chemical Industries, Ltd.) and 50 mL of a 48% aqueous sodium hydroxide solution. The contents were maintained at 100° C. for four hours with stirring.

The molar ratio of barium hydroxide to calcium hydroxide was 0.97:0.03, and the ratio of the sum of the moles of barium hydroxide and calcium hydroxide to the mole of titanium dioxide was 1.01.

The reaction solution was then filtered to give a cake, which was dried in a dryer at 110° C. for six hours. The dry solid was crushed in a mortar to obtain a barium calcium titanate powder.

Comparative Example 5

A barium calcium titanate powder was obtained as in Comparative Example 4, except that the following steps were added: a step of hydrothermally treating the slurry in an autoclave vessel at 160° C. for 24 hours, where the slurry had been obtained by maintaining the contents at 100° C. for four hours; a step of heating the dry solid at 300° C. for two hours in an atmospheric sintering furnace; and a step of crushing the heated solid in a mortar.

Comparative Example 6

A barium calcium titanate powder was obtained as in Comparative Example 5, except that the heating was performed in an atmosphere sintering furnace at 900° C. for two hours.

Comparative Example 7

A barium calcium titanate powder was obtained as in Comparative Example 4, except that the amount of pure water was 550 mL, the amount of barium hydroxide was 198.1 g, and the amount of calcium hydroxide was 11.11 g. Under the above-described conditions, when the reaction was performed at 100° C., the molar ratio of barium hydroxide to calcium hydroxide was 0.69:0.31, and the ratio of the sum of the moles of barium hydroxide and calcium hydroxide to the mole of titanium dioxide was 1.01.

Comparative Example 8

A barium calcium titanate powder was obtained as in Comparative Example 7, except that the following steps were added: a step of hydrothermally treating the slurry in an autoclave vessel at 160° C. for 24 hours, where the slurry had been obtained by maintaining the contents at 100° C. for four hours; a step of heating the attached dry solid at 300° C. for two hours in an atmospheric sintering furnace; and a step of crushing the heated solid in a mortar.

Comparative Example 9

A barium calcium titanate powder was obtained as in Comparative Example 8, except that the heating was performed in an atmosphere sintering furnace at 900° C. for two hours.

The barium calcium titanate powders and the barium strontium titanate powders obtained in the examples and comparative examples were subjected to compositional analysis and determination of crystal structure by the following techniques. The barium titanate powders, barium calcium titanate powders, and barium strontium titanate powders were subjected to measurement of specific surface area.

(Compositional Analysis)

The compositional analysis (Ca/Ti, Ca/(Ba+Ca), (Ba+Ca)/Ti) was performed using an X-ray fluorescence analyzer (ZSX Primus II, available from Rigaku Corporation, calibration curve method).

(Crystal Structure)

The crystal structure was determined using a powder X-ray diffractometer (RINT-TTR III, available from Rigaku Corporation, radiation source CuKα).

(Specific Surface Area)

The specific surface area of each of the barium titanate powders, barium calcium titanate powders, and barium strontium titanate powders was measured using a fully automatic specific surface area meter (HM model-1220, available from MOUNTEC Co., Ltd.) by the single point BET method. Before the measurement, each powder was degassed at 205° C. for 30 minutes.

Table 1 shows the conditions of the steps in Examples 1 to 16 and Comparative Examples 1 to 3, Table 2 shows the conditions of the steps in Comparative Examples 4 to 9, and Table 3 shows the physical properties of the obtained barium calcium titanate powders and barium strontium titanate. Table 4 shows the physical property values (e.g., coefficient of variation) relating to the ratio of a maximum length (absolute maximum length) mean value to an equivalent circle diameter mean value (Absolute maximum length/Equivalent circle diameter) of the barium calcium titanate powders obtained in Examples 1 and 8 to 14 and Comparative Examples 1, 3, 5, and 6 in which the fourth step was performed. The maximum length, equivalent circle diameter, and coefficient of variation of the barium calcium titanate powders were determined by the following techniques.

(Maximum Length and Equivalent Circle Diameter)

Measurement was performed by analyzing an SEM image of a barium calcium titanate powder taken at 50,000× magnification using image analysis software (Win-ROOF2015 available from Mitani Corporation).

(Coefficient of Variation)

The coefficient of variation was determined by dividing the standard deviation of the Absolute maximum length/Equivalent circle diameter of 200 to 300 perovskite compound particles measured by the above-described technique by the mean value of Absolute maximum length/Equivalent circle diameter.

Figure 1:
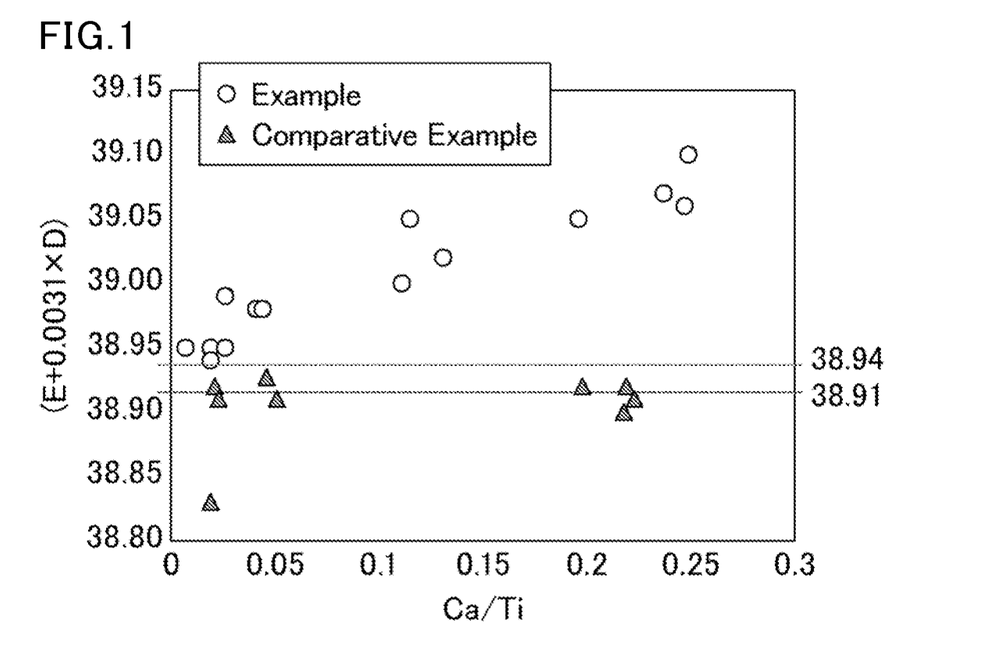
FIG. 1 is a graph showing the relationship between the Ca/Ti ratio and the value of E+0.0031×D of barium calcium titanate obtained in Examples 1 to 14 and Comparative Examples 1 to 9.
Figure 2:
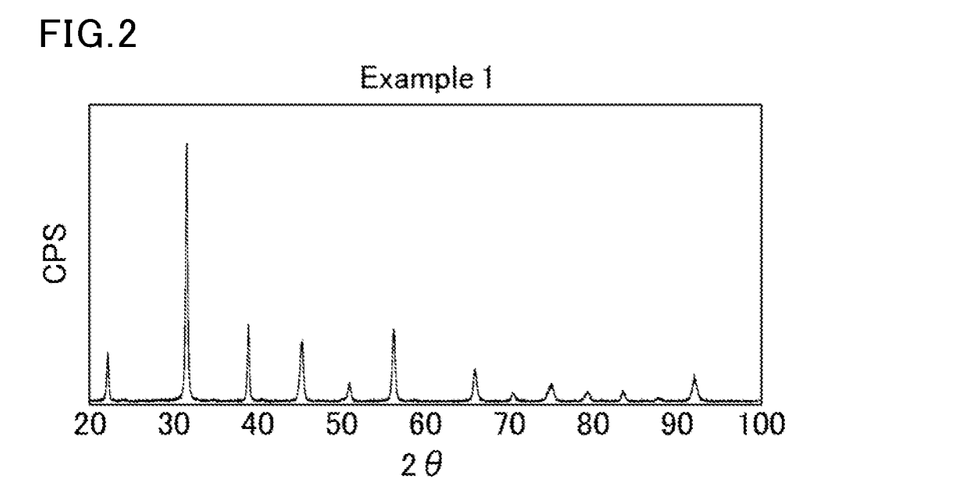
FIG. 2 is a XRD chart of the barium calcium titanate obtained in Example 1.
Figure 3:
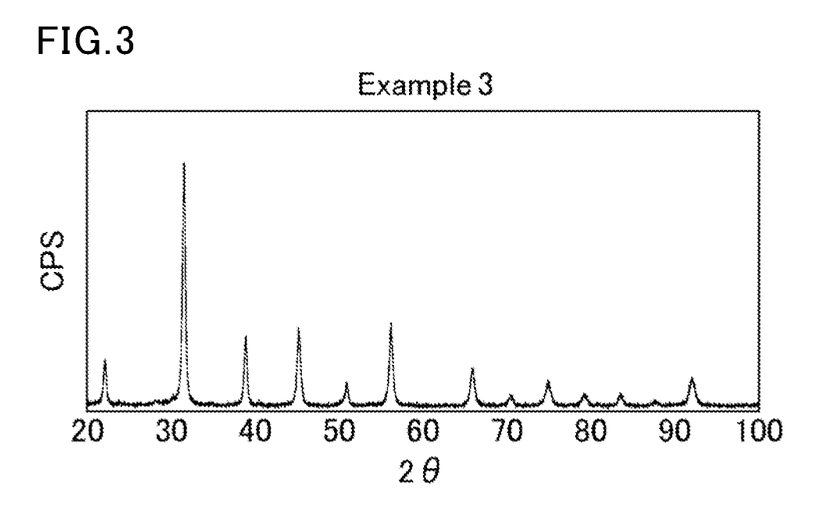
FIG. 3 is a XRD chart of the barium calcium titanate obtained in Example 3.
Figure 4:
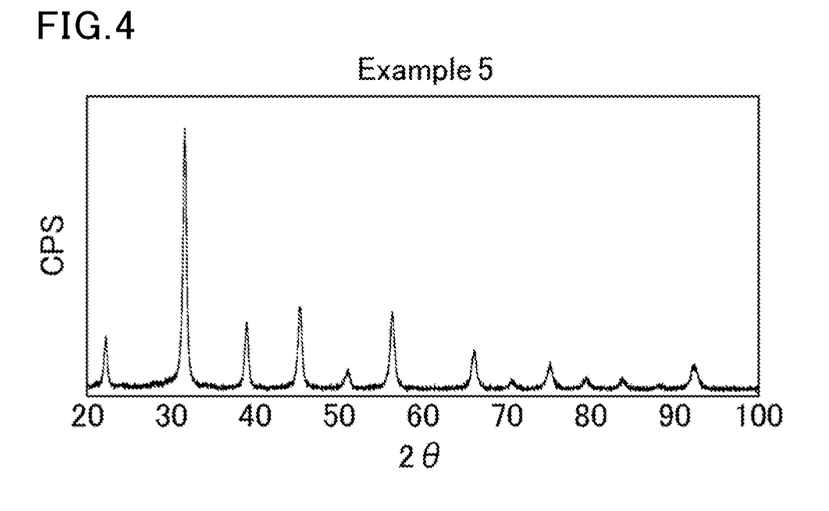
FIG. 4 is a XRD chart of the barium calcium titanate obtained in Example 5.
Figure 5:
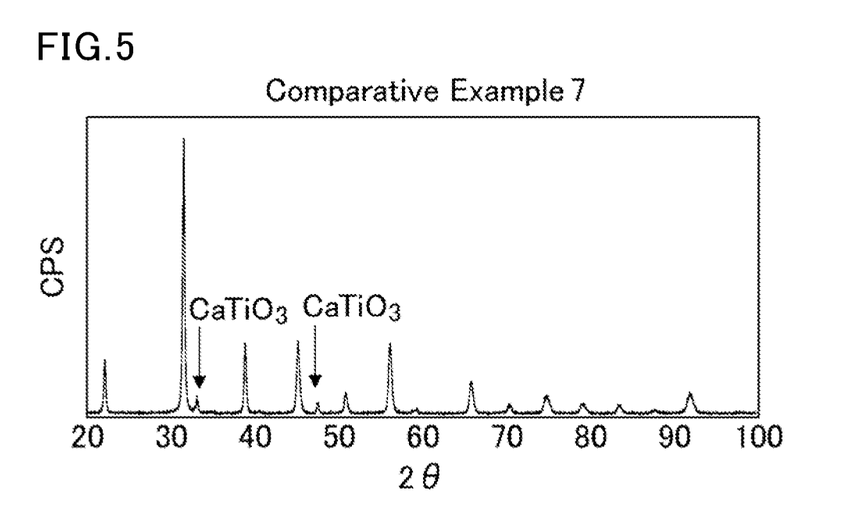
FIG. 5 is a XRD chart of the barium calcium titanate obtained in Comparative Example 7.
Figure 6:
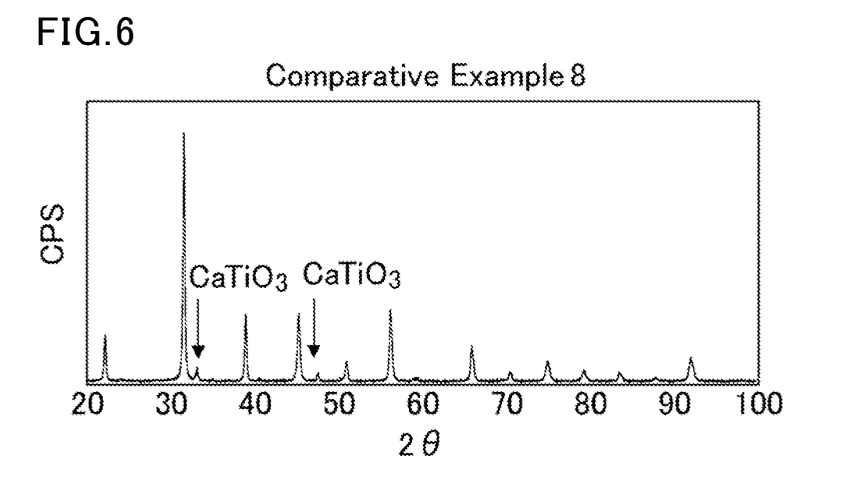
FIG. 6 is a XRD chart of the barium calcium titanate obtained in Comparative Example 8.
Figure 7:
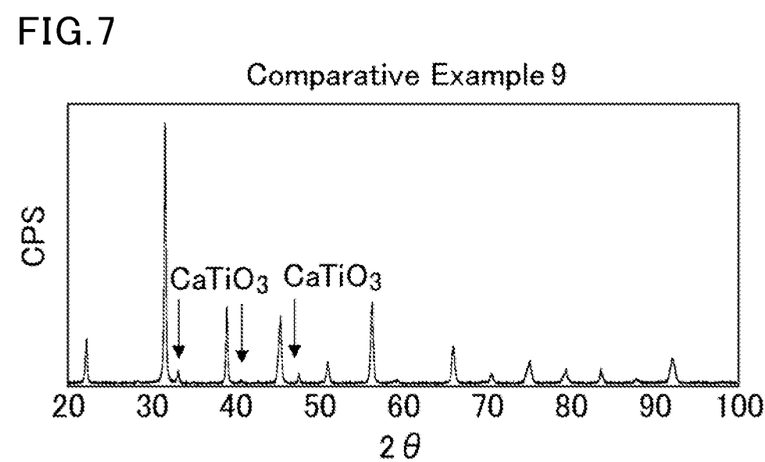
FIG. 7 is a XRD chart of the barium calcium titanate obtained in Comparative Example 9.
Figure 8:
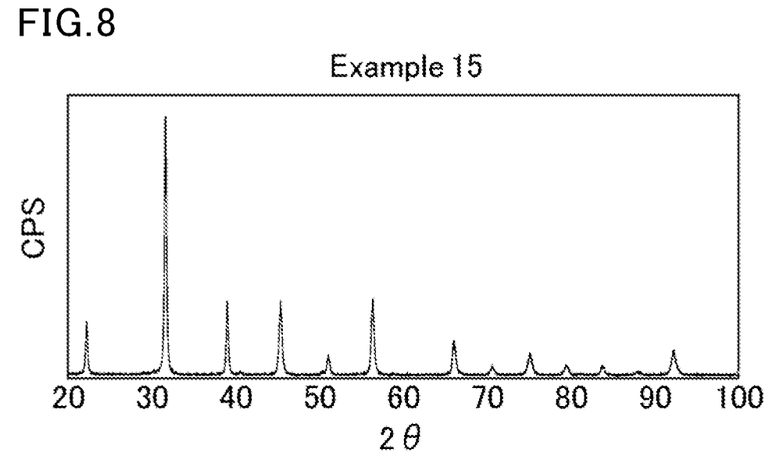
FIG. 8 is a XRD chart of barium strontium titanate obtained in Example 15.
Figure 9:
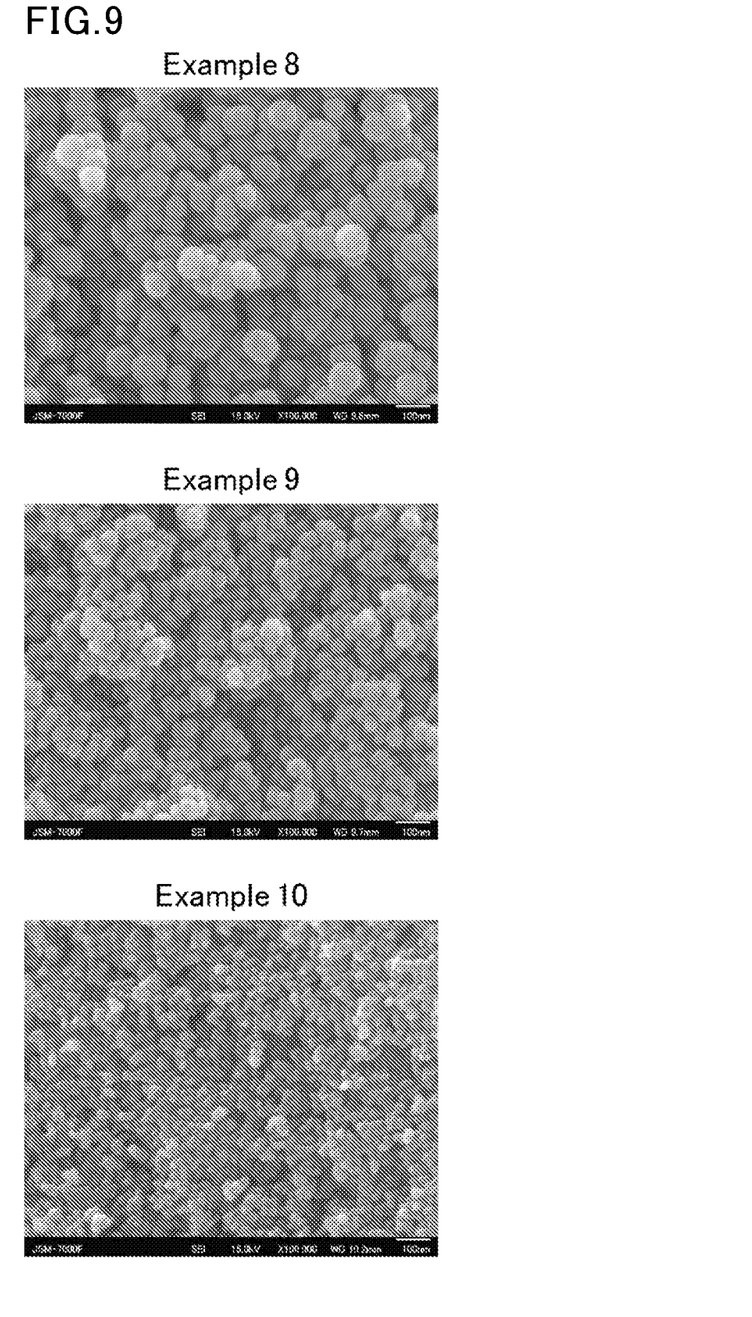
FIG. 9 includes images showing the results of electron microscope (SEM) observation of the barium calcium titanate obtained in Examples 8 to 10.
Figure 10:
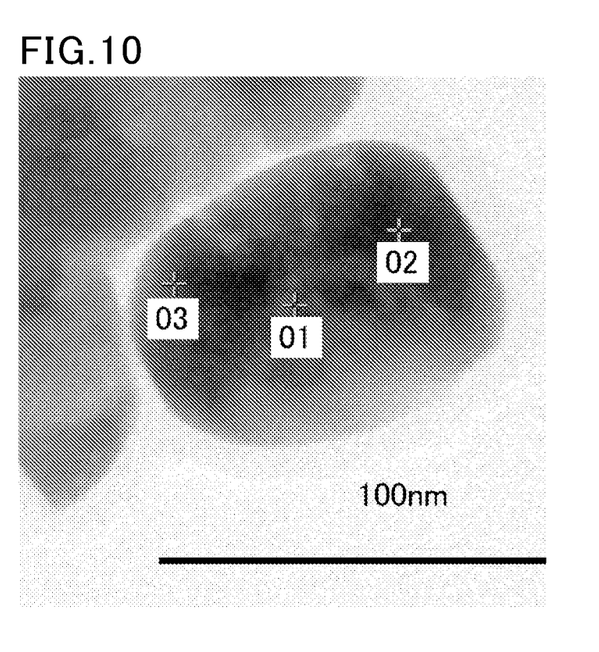
FIG. 10 is an image of the regions of the barium calcium titanate obtained in Example 1 subjected to TEM-EDS analysis.

FIG. 1 illustrates the relationship between the Ca/Ti ratio and the value of E+0.0031×D of the barium calcium titanate obtained in Examples 1 to 14 and Comparative Examples 1 to 9. FIGS. 2 to 4 illustrate the XRD charts of the barium calcium titanate obtained in Examples 1, 3, and 5. FIGS. 5 to 7 illustrate the XRD charts of the calcium barium titanate obtained in Comparative Examples 7 to 9. FIG. 8 illustrates the XRD chart of the barium strontium titanate obtained in Example 15. FIG. 9 illustrates the SEM images of the barium calcium titanate obtained in Examples 8 to 10. FIG. 10 and Table 5 show the results of TEM-EDS analysis of the barium calcium titanate obtained in Example 1.

TABLE 1

| | Material | First step | | | Second step | | | | Fourth step | | | |
| | Hydrothermal reaction condition | Acid treatment pH | Ba/Ti | SSA | Calcium acetate monohydrate [g] | Strontium acetate hemihydrate [g] | Drying technique | Third step Sintering condition | 10% NaOH a.q.[g] | Barium hydroxide [g] | Hydrothermal reaction condition |
|---|---|---|---|---|---|---|---|---|---|---|---|
| Example 1 | 110° C., 2 h | 6 | 0.870 | 68 | 0.98 | | Box dryer | 800° C., 2 h | 2 | None | 160° C., 24 h |
| Example 2 | ↑ | ↑ | ↑ | ↑ | ↑ | | ↑ | 700° C., 2 h | ↑ | None | ↑ |
| Example 3 | ↑ | ↑ | ↑ | ↑ | ↑ | | ↑ | 600° C., 2 h | ↑ | None | ↑ |
| Example 4 | 100° C., 2 h | ↑ | 0.671 | 119 | 1.51 | | ↑ | 800° C., 2 h | | | |
| Example 5 | ↑ | ↑ | ↑ | ↑ | 1.89 | | ↑ | ↑ | | | |
| Example 6 | ↑ | ↑ | ↑ | ↑ | ↑ | | ↑ | 700° C., 2 h | | | |
| Example 7 | ↑ | ↑ | ↑ | ↑ | ↑ | | ↑ | 600° C., 2 h | | | |
| Example 8 | 110° C. 2 h | ↑ | 0.870 | 68 | 0.15 | | Spray dryer | 800° C., 2 h | None | 1.29 | ↑ |

TABLE 1-continued

| | Material Hydrothermal reaction condition | First step Acid treatment pH | First step Ba/Ti | First step SSA | Second step Calcium acetate monohydrate [g] | Second step Strontium acetate hemihydrate [g] | Drying technique | Third step Sintering condition | Fourth step 10% NaOH a.q.[g] | Fourth step Barium hydroxide [g] | Fourth step Hydrothermal reaction condition |
|---|---|---|---|---|---|---|---|---|---|---|---|
| Example 9 | ↑ | ↑ | ↑ | ↑ | 0.38 | | ↑ | 700° C., 2 h | None | 0.99 | ↑ |
| Example 10 | ↑ | ↑ | ↑ | ↑ | 0.23 | | ↑ | 600° C., 2 h | None | 1.19 | ↑ |
| Example 11 | ↑ | ↑ | ↑ | ↑ | 0.38 | | ↑ | 900° C., 2 h | None | 0.99 | ↑ |
| Example 12 | ↑ | ↑ | ↑ | ↑ | 0.08 | | Box dryer | 700° C., 2 h | None | 1.39 | ↑ |
| Example 13 | ↑ | 9 | 0.928 | 57 | 0.15 | | ↑ | 800° C., 2 h | None | 0.71 | ↑ |
| Example 14 | 190° C., 1 h | 5 | 0.942 | 24 | 0.38 | | ↑ | 600° C., 2 h | None | 0.28 | ↑ |
| Example 15 | 110° C., 2 h | 6 | 0.870 | 68 | | 0.92 | ↑ | 800° C., 2 h | | | |
| Example 16 | 110° C., 2 h | 6 | 0.870 | 68 | | 0.46 | ↑ | 800° C., 2 h | | | |
| Comparative Example 1 | 110° C., 2 h | Not treated | 1.000 | 50 | 1.51 | | ↑ | 800° C., 2 h | 2 | None | ↑ |
| Comparative Example 2 | ↑ | Not treated | ↑ | ↑ | ↑ | | ↑ | ↑ | | | |
| Comparative Example 3 | ↑ | Not treated | ↑ | ↑ | 0.38 | | ↑ | 700° C., 2 h | | | |

TABLE 2

| | Conditions of steps | | | |
|---|---|---|---|---|
| | Ba:Ca | Reaction condition | Hydrothermal reaction condition | Sintering condition |
| Comparative Example 4 | 0.97:0.03 | 100° C., 4 h | None | None |
| Comparative Example 5 | ↑ | ↑ | 160° C., 24 h | 300° C., 2 h |
| Comparative Example 6 | ↑ | ↑ | ↑ | 900° C., 2 h |
| Comparative Example 7 | 0.69:0.31 | ↑ | None | None |
| Comparative Example 8 | ↑ | ↑ | 160° C., 24 h | 300° C., 2 h |
| Comparative Example 9 | ↑ | ↑ | ↑ | 900° C., 2 h |

TABLE 3

| | Physical properties of powders | | | | | | | |
|---|---|---|---|---|---|---|---|---|
| | D (SSA) | A/Ti | A/(Ba + A) = x | (Ba + A)/Ti | E ((111) plane, 2θ) | E+0.0031*D | >38.91 | Formula (2) |
| Example 1 | 18.4 | 0.131 | 0.129 | 1.001 | 38.96 | 39.02 | Yes | Yes |
| Example 2 | 24.8 | 0.111 | 0.111 | 1.001 | 38.93 | 39.00 | Yes | Yes |
| Example 3 | 42.9 | 0.115 | 0.115 | 0.996 | 38.92 | 39.05 | Yes | Yes |
| Example 4 | 21.4 | 0.196 | 0.226 | 0.867 | 38.99 | 39.05 | Yes | Yes |
| Example 5 | 21.9 | 0.249 | 0.266 | 0.936 | 39.03 | 39.10 | Yes | Yes |
| Example 6 | 33.1 | 0.237 | 0.262 | 0.908 | 38.97 | 39.07 | Yes | Yes |
| Example 7 | 60.2 | 0.247 | 0.267 | 0.926 | 38.87 | 39.06 | Yes | Yes |
| Example 8 | 17.1 | 0.019 | 0.019 | 1.000 | 38.89 | 38.95 | Yes | Yes |
| Example 9 | 29.9 | 0.041 | 0.042 | 0.976 | 38.88 | 38.98 | Yes | Yes |
| Example 10 | 52.4 | 0.026 | 0.027 | 0.985 | 38.83 | 38.99 | Yes | Yes |
| Example 11 | 15.1 | 0.044 | 0.044 | 0.990 | 38.93 | 38.98 | Yes | Yes |
| Example 12 | 24.1 | 0.007 | 0.008 | 0.949 | 38.88 | 38.95 | Yes | Yes |
| Example 13 | 17.6 | 0.019 | 0.019 | 0.997 | 38.89 | 38.94 | Yes | Yes |
| Example 14 | 21.8 | 0.026 | 0.026 | 0.999 | 38.89 | 38.95 | Yes | Yes |
| Example 15 | 11.0 | 0.099 | 0.099 | 0.997 | 38.98 | 39.02 | Yes | Yes |

TABLE 3-continued

| | Physical properties of powders | | | | | | | |
|---|---|---|---|---|---|---|---|---|
| | D (SSA) | A/Ti | A/(Ba + A) = x | (Ba + A)/Ti | E ((111) plane, 2θ) | E+0.0031*D | >38.91 | Formula (2) |
| Example 16 | 13.7 | 0.051 | 0.053 | 0.947 | 38.90 | 38.94 | Yes | Yes |
| Comparative Example 1 | 10.8 | 0.051 | 0.050 | 1.012 | 38.87 | 38.91 | Yes | No |
| Comparative Example 2 | 13.9 | 0.198 | 0.165 | 1.198 | 38.88 | 38.92 | Yes | No |
| Comparative Example 3 | 18.4 | 0.046 | 0.046 | 1.030 | 38.87 | 38.93 | Yes | No |
| Comparative Example 4 | 52.9 | 0.019 | 0.019 | 0.995 | 38.67 | 38.83 | No | No |
| Comparative Example 5 | 41.0 | 0.021 | 0.021 | 0.996 | 38.79 | 38.92 | Yes | No |
| Comparative Example 6 | 7.5 | 0.023 | 0.023 | 0.998 | 38.88 | 38.91 | Yes | No |
| Comparative Example 7 | 65.6 | 0.218 | 0.215 | 1.015 | 38.70 | 38.90 | No | No |
| Comparative Example 8 | 26.7 | 0.219 | 0.216 | 1.014 | 38.84 | 38.92 | Yes | No |
| Comparative Example 9 | 7.0 | 0.223 | 0.220 | 1.015 | 38.89 | 38.91 | Yes | No |

A: Examples 1 to 14 and Comparative Examples 1 to 9: Ca, Examples 15 and 16: Sr

As shown in Table 3, all the barium calcium titanate powders obtained in Examples 1 to 14 satisfy the relationship (2). FIG. 1 also reveals that the value of E+0.0031×D increases in response to the increase in the Ca/Ti ratio. The barium calcium titanate powders obtained in Comparative Examples 1 to 3, which are not acid treated in the first step, each have E greater than the value of −0.0031×D+38.91, but do not satisfy the relationship (2). This suggests that replacement by calcium ions has occurred, but the degree of the replacement is low.

This indicates that the acid treatment in the first step enables synthesis of barium calcium titanate in which sufficient replacement by Ca has been occurred.

The barium strontium titanate powders obtained in Examples 15 and 16 satisfy the relationship (2). This indicates that the acid treatment in the first step enables synthesis of barium strontium titanate in which sufficient replacement by Sr has been occurred.

As shown in Table 3, the barium calcium titanate of Comparative Examples 4 to 9 produced by a production method including a combination of a conventional wet reaction and a heating reaction had a BET specific surface area of 7.0 to 65.6 m²/g. In particular, in Comparative Examples 4 and 7 (see Table 2) in which heating was not performed, very fine particles having a BET specific surface area of 50 m²/g or more were synthesized. Yet, no replacement by calcium ions is believed to have occurred because E is not greater than the value of −0.0031×D+38.91 in Comparative Examples 4 and 7. Also in Comparative Examples 5, 6, 8, and 9 (see Table 2) in which heating was performed, E was greater than the value of −0.0031×D+ 38.91, but did not satisfy the relationship (2), suggesting that replacement by calcium ions occurred, but the degree of the replacement was low.

As shown in Table 3, in the comparative examples, the value of E+0.0031×D did not exceed 38.94 even when the Ca/Ti ratio increased.

As shown in FIGS. 2 to 4, the barium calcium titanate of each of Examples 1, 3, and 5 is in the form of a single phase. On the other hand, as shown in FIGS. 5 to 7, a calcium titanate phase is confirmed in Comparative Examples 7 to 9, indicating the presence of a mixed phase. As shown in FIG. 8, the barium strontium titanate of Example 15 is in the form of a single phase.

TABLE 4

| | D (SSA) | Ca/Ti | Equivalent circle diameter [nm] | Absolute maximum length/Equivalent circle diameter | | | |
|---|---|---|---|---|---|---|---|
| | | | | Mean | Maximum | Minimum | Coefficient of variation |
| Example 1 | 18.4 | 0.131 | 54 | 1.18 | 1.37 | 1.07 | 0.05 |
| Example 8 | 17.1 | 0.019 | 59 | 1.16 | 1.43 | 1.06 | 0.05 |
| Example 9 | 29.9 | 0.041 | 36 | 1.21 | 1.45 | 1.06 | 0.06 |
| Example 10 | 52.4 | 0.026 | 25 | 1.18 | 1.36 | 1.06 | 0.06 |
| Example 11 | 15.1 | 0.044 | 73 | 1.15 | 1.28 | 1.06 | 0.04 |
| Example 12 | 24.1 | 0.007 | 55 | 1.14 | 1.38 | 1.05 | 0.04 |
| Example 13 | 17.6 | 0.019 | 66 | 1.14 | 1.38 | 1.04 | 0.04 |
| Example 14 | 21.8 | 0.026 | 60 | 1.14 | 1.43 | 1.06 | 0.04 |
| Comparative Example 1 | 10.8 | 0.051 | 95 | 1.14 | 1.56 | 1.06 | 0.08 |

TABLE 4-continued

|  | D (SSA) | Ca/Ti | Equivalent circle diameter [nm] | Absolute maximum length/Equivalent circle diameter | | | |
|---|---|---|---|---|---|---|---|
|  |  |  |  | Mean | Maximum | Minimum | Coefficient of variation |
| Comparative Example 3 | 18.4 | 0.046 | 65 | 1.22 | 1.96 | 1.07 | 0.10 |
| Comparative Example 5 | 41.0 | 0.021 | 58 | 1.21 | 1.55 | 1.08 | 0.08 |
| Comparative Example 6 | 7.5 | 0.023 | 111 | 1.17 | 1.65 | 1.05 | 0.08 |

As shown in Table 4, in Comparative Examples 1, 3, 5, and 6, the maximum value of Absolute maximum length/Equivalent circle diameter was more than 1.5, and the coefficient of variation was 0.08 or higher. In Examples 1 and 8 to 14, the maximum value of Absolute maximum length/Equivalent circle diameter was 1.5 or less, and the coefficient of variation was 0.06 or lower, indicating high independence of the particles. The state of the particles of Examples 8 to 10 is as shown in FIG. 9. The barium calcium titanate obtained in Example 1 has a larger BET specific surface area than that of Comparative Example 1, indicating that the acid treatment in the first step prevents or reduces particle growth in the subsequent heating.

The barium calcium titanate obtained in Example 1 was analyzed for the composition ratios of Ca, Ba, and Ti at the regions O1, O2, and O3 in FIG. 10. Table 5 shows the results.

TABLE 5

|  | Ca | Ba + Ti |
|---|---|---|
| O1 | 0.34 | 100 |
| O2 | 0.28 | 100 |
| O3 | 0.29 | 100 |

As shown in Table 5, the amount of calcium ions detected is almost the same between an inner portion and an outer portion in the particle, indicating that calcium ions are present not only on the particle surface but also in the particle.

The results confirm that the production method of the present invention can produce a fine particulate barium titanate in which calcium forms a sufficiently homogeneous solid solution.

The invention claimed is:

1. A method of producing a perovskite compound represented by the following formula (1):

wherein A represents Ca or Sr, and x is a number satisfying $0.00 < x \leq 0.30$,
the method comprising:
acid washing barium titanate so as to obtain barium titanate having a ratio of barium element to titanium element of lower than 1.00;
mixing the barium titanate having a ratio of barium element to titanium element of lower than 1.00 obtained in the acid washing, and a calcium salt or a strontium salt;
drying the mixture so as to obtain a dry mixture; and
heating the dry mixture so as to obtain the perovskite compound.

2. The method of producing a perovskite compound according to claim 1,
wherein the barium titanate having the ratio of barium element to titanium element of lower than 1.00 obtained in the acid washing has a Brunauer-Emmett-Teller (BET) specific surface area in a range from 20 to 130 m²/g.

3. The method of producing a perovskite compound according to claim 1, further comprising
breaking up agglomerated particles of the perovskite compound obtained in the heating the dry mixture by heating the obtained perovskite compound in a solvent at a temperature in a range from 30° C. to 500° C.

* * * * *